US007783966B2

(12) United States Patent
Mitsui

(10) Patent No.: US 7,783,966 B2
(45) Date of Patent: Aug. 24, 2010

(54) SYSTEM AND METHOD FOR PERFORMING PROCESSING, SUCH AS SPREADSHEET PROCESSING

(75) Inventor: Kinichi Mitsui, Hachioji (JP)

(73) Assignee: International Business Macines Corporation, Armonk, NY (US)

( * ) Notice: Subject to any disclaimer, the term of this patent is extended or adjusted under 35 U.S.C. 154(b) by 203 days.

(21) Appl. No.: 11/685,267

(22) Filed: Mar. 13, 2007

(65) Prior Publication Data
US 2007/0220416 A1    Sep. 20, 2007

(30) Foreign Application Priority Data
Mar. 14, 2006    (JP) .............................. 2006-068746

(51) Int. Cl.
*G06F 17/00* (2006.01)
(52) U.S. Cl. .................. 715/212; 715/219; 715/220
(58) Field of Classification Search ................. 715/212, 715/219, 220
See application file for complete search history.

(56) References Cited

U.S. PATENT DOCUMENTS

| | | | | |
|---|---|---|---|---|
| 5,819,102 | A * | 10/1998 | Reed et al. ..................... | 712/34 |
| 7,143,340 | B2 * | 11/2006 | Brid ............................ | 715/227 |
| 2002/0010743 | A1 * | 1/2002 | Ryan et al. ................... | 709/205 |
| 2002/0049784 | A1 * | 4/2002 | Bauchot ...................... | 707/503 |
| 2002/0174151 | A1 * | 11/2002 | Schneider et al. ........... | 708/100 |
| 2003/0106040 | A1 * | 6/2003 | Rubin et al. ................ | 717/106 |
| 2003/0110191 | A1 | 6/2003 | Handsaker et al. | |
| 2004/0133565 | A1 * | 7/2004 | Hinshaw et al. ............. | 707/3 |
| 2004/0133567 | A1 * | 7/2004 | Witkowski et al. ........... | 707/3 |
| 2006/0271841 | A1 * | 11/2006 | Thanu et al. ................ | 715/503 |
| 2007/0073707 | A1 * | 3/2007 | Rychener .................... | 707/10 |
| 2008/0028287 | A1 * | 1/2008 | Handsaker et al. .......... | 715/212 |
| 2008/0256432 | A1 * | 10/2008 | Sambandam et al. ........ | 715/212 |

FOREIGN PATENT DOCUMENTS

JP    08-305777    11/1996

(Continued)

OTHER PUBLICATIONS

McFedries, Paul, "Formulas and Functions with Microsoft Excel 2003", Jun. 11, 2004, pp. 1-12.*

(Continued)

*Primary Examiner*—Rachna S Desai
(74) *Attorney, Agent, or Firm*—Justin M. Dillon; Shimokaji & Associates, P.C.

(57) ABSTRACT

A system for performing a calculation processing for each cell in a sheet by setting a calculation formula to calculate values for the cell. The system includes: an input data selection unit for sequentially selecting, in response to association of a or a plurality of cells in a sheet having a plurality of input data recorded therein with a first cell, the plurality of input data as values for the first cell; a calculation unit for performing, in response to selection of the respective input data as values for the first cell, calculations of a calculation formula set in a cell other than the first cell and referring to the first cell; and a data output unit for outputting calculation results of the calculation formula obtained by the calculation unit for each of the input data as values of a or a plurality of second cells.

1 Claim, 14 Drawing Sheets

FOREIGN PATENT DOCUMENTS

| | | |
|---|---|---|
| JP | 2003-067550 | 3/2003 |
| JP | 2003099702 | 4/2003 |
| JP | 2003-196577 | 7/2003 |
| JP | 2003196577 | 7/2003 |
| JP | 2004-280705 | 10/2004 |

OTHER PUBLICATIONS

Microsoft Corporation, Excel 2003 Product Information, Homepage URL "http://www.microsoft.com/japan/office/excel/prodinfo/default.mspx".

* cited by examiner

| S1 | A | B | C |
|---|---|---|---|
| 1 | | | |
| 2 | StockNames | | =Query('myportfolio', 'stockname') |
| 3 | Quantity | | =Query('myportfolio', 'quantity') |
| 4 | PurchasePrice | | =Query('myportfolio', 'purchaseprice') |
| 5 | | | |
| 6 | Names | Gains | |
| 7 | AAA | | |
| 8 | BBB | | 210 |
| 9 | CCC | | |
| 10 | | | |
| 11 | Total | =SUM(B7:B9) | |
| 12 | | | |
| 13 | | | |

FIG. 2

| S2 | A | B | C |
|----|---|---|---|
| 1 | Index | =Index() | |
| 2 | | | |
| 3 | StockNames | | |
| 4 | Quantity | | |
| 5 | PurchasePrice | | |
| 6 | CurrentPrice | | =StockQuote(C3)... |
| 7 | Gain | | =C4*(C6-C5) |
| 8 | | | |
| 9 | | | |
| 10 | | | |
| 11 | | | |

FIG. 3

| EXTERNAL SHEET ID | EXTERNAL CELL ID | INTERNAL SHEET ID | INTERNAL CELL ID | TYPE |
|---|---|---|---|---|
| S1 | C2 | S2 | C3 | INPUT |
| S1 | C3 | S2 | C4 | INPUT |
| S1 | C4 | S2 | C5 | INPUT |
| S1 | B7~B9 | S2 | C7 | OUTPUT |

360

| S1 | A | B | C |
|---|---|---|---|
| 1 | | | |
| 2 | StockNames | | AAA, BBB, CCC |
| 3 | Quantity | | 200, 100, 100 |
| 4 | PurchasePrice | | 80, 28, 5 |
| 5 | | | |
| 6 | Names | Gains | |
| 7 | AAA | 3000 | |
| 8 | BBB | −530 | |
| 9 | CCC | 210 | |
| 10 | | | |
| 11 | Total | 2680 | |
| 12 | | | |
| 13 | | | |

FIG. 6

# SYSTEM AND METHOD FOR PERFORMING PROCESSING, SUCH AS SPREADSHEET PROCESSING

CROSS-REFERENCE TO RELATED APPLICATIONS

This application claims the benefit of priority of Japanese Patent Application No. 2006-068746 filed on Mar. 14, 2006, and entitled "SYSTEM AND METHOD FOR PERFORMING PROCESSING, SUCH AS SPREADSHEET PROCESSING" hereby incorporated by reference herein for all purposes.

BACKGROUND

1. Technical Field

Embodiments of the present invention relate to a system and a method for performing processing such as spreadsheet. Particularly, embodiments of the present invention relate to a system and a method for performing calculation based on a value of a cell included in a sheet.

2. Description of Related Art

In a system for performing spreadsheet processing, a user prepares a spreadsheet by inputting values in elements called cells. The user can also record, in a cell, a formula obtained by referring to a value in another cell, and a calculation result of the formula can be displayed in the cell in which the formula is recorded. When a mathematical function is prepared in advance and is included in a formula, the user can also easily perform a comparatively high level calculation. However, a function that can be included in a mathematical function is predesignated, and should the user desire to perform another, different calculation, a separate program must be prepared. As one example of a system for performing spreadsheet processing, Excel® Provided by Microsoft Corporation, of Redmond, Wash.) is used herein.

BRIEF SUMMARY

A system, method, and computer program product for performing calculation processing for each cell in a sheet by setting a calculation formula to calculate values for the cell is disclosed. In one embodiment, a system is provided which includes: an input data selection unit to sequentially select, in response to an association of a cell or a plurality of cells in a sheet having a plurality of input data recorded therein with a first cell, the plurality of input data as values for the first cell; a calculation unit to perform, in response to a selection of the corresponding input data as values for the first cell, calculations of a calculation formula set in a cell other than the first cell and referring to the first cell; and a data output unit to output calculation results of the calculation formula obtained by the calculation unit for each of the input data as values of a cell or a plurality of second cells.

BRIEF DESCRIPTION OF THE DRAWINGS

It is believed that the above features, advantages and purposes of the invention will be better understood from the following description of one or more embodiments of the invention taken in conjunction with the accompany drawings, in which:

FIG. 2 is a diagram showing an external spreadsheet 22 as an example of a first sheet included in a database 20;

FIG. 3 is a diagram showing an internal spreadsheet 24 as an example of a second sheet included in the database 20;

FIG. 6 is a diagram showing an example of the external spreadsheet 22 displayed by a display unit 360;

The use of the same or similar reference symbols within the accompanying drawings is intended to indicate similar or identical items.

DETAILED DESCRIPTION OF AN ILLUSTRATIVE EMBODIMENT

One or more illustrative embodiments of the present invention will now be described. However, it should be understood however that variations may be made from those embodiments described herein and in the appended claims without departing from the broader spirit and scope of the present invention and that not all the combinations explained in the explicitly described embodiment are always required.

Figure 1:
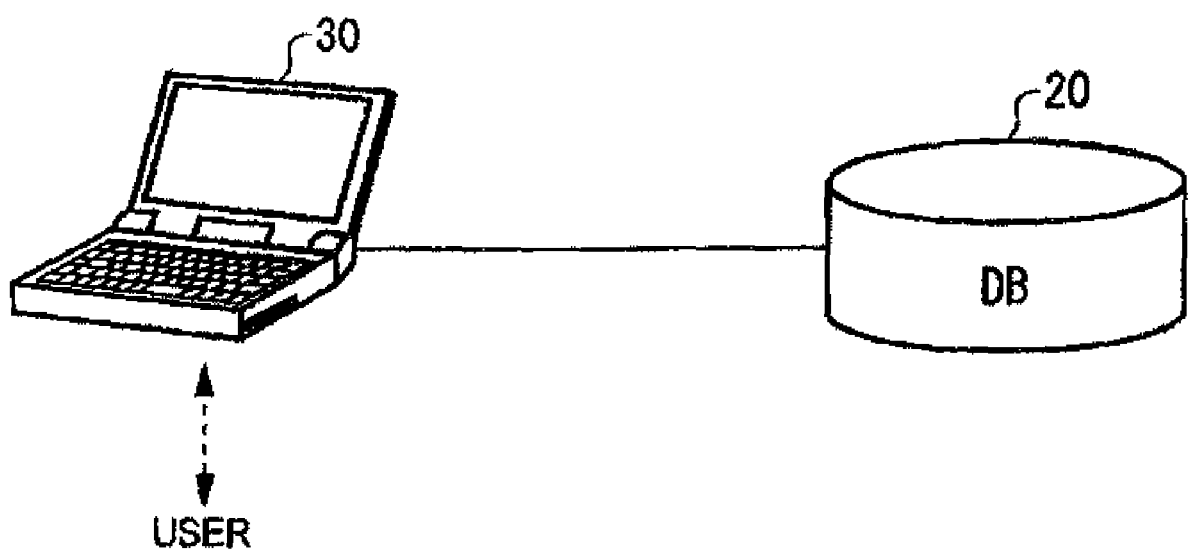
FIG. 1 is a diagram showing the general arrangement of a spreadsheet system 10.

FIG. 1 shows the general arrangement of a spreadsheet system 10. The spreadsheet system 10 comprises a database 20 and a spreadsheet apparatus 30. A plurality of spreadsheets for performing a spreadsheet processing is recorded in the database 20. Each of the spreadsheets includes a plurality of data fields, called as cells. Each of the cells has data recorded therein or calculation formulas set therein. A calculation formula recorded in a certain cell may refer to data stored in another cell as input parameters. The spreadsheet apparatus 30 performs calculations of a calculation formula set in each cell, based on input parameters, and displays the calculation results in that cell. Further, the spreadsheet apparatus 30 may accept an input for changing data recorded in each cell. In response to updating of data that are referred to as the input parameters, the spreadsheet apparatus 30 performs calculation of the calculation formula that refers to the pertinent data. As a result, and in accordance with the updating of data, the results obtained using the calculation formula that refers to the pertinent data are also updated immediately and displayed on the screen.

The object of the spreadsheet apparatus 30 in this embodiment is to permit the spreadsheet apparatus 30 to easily realize comparatively high level calculation, such as an iteration processing, without a separate program having to be created. The configuration of the spreadsheet apparatus 30 will now be explained in detail by employing, as an example, the processing performed to calculate gains and losses for a plurality of named stocks that are held.

FIG. 2 shows an external spreadsheet 22 as an example of a first spreadsheet included in the database 20. The external spreadsheet 22 employs an identifier S1, and represents an external processing performed outside the iteration processing. The external processing means a processing performed before the iteration processing is begun and after the iteration processing ends. Specifically, the external spreadsheet 22 includes external input cells 200 for recording multiple sets of input data. The external spreadsheet 22 in the example in FIG. 2 includes the external input cells 200 at coordinates C2 to C4. The external input cell 200 located at coordinate C2 stores the names of a plurality of held stocks as a plurality of input data.

"Recording a plurality of input data" includes not only a case wherein input data are directly recorded, but also a case wherein a formula for acquiring input data is recorded. In the example in FIG. 2, the external input cell 200 has a formula recorded therein for acquiring the names of multiple stocks from an external file. In this calculation formula, Query (file name, entry name) represents a formula for acquiring a plurality of data, corresponding to items of "entry name", from the file "file name". As a result of calculations of the calculation formula, the names of the multiple stocks are acquired from an external file and recorded in the cell located at coordinate C2 (hereinafter referred to as cell C2).

The external input cell 200 located at coordinate C3 has respective quantities of held stocks recorded therein as input data. Further, the external input cell 200 located at coordinate C4 has the purchase prices of the held stocks recorded as a plurality of input data. Similarly to the names of the stocks, these input data may be obtained as a result of calculations of the calculation formulas that include Query functions.

The external spreadsheet 22 includes an entry indicating the stock names in the cell A6, and also includes the respective stock names in the cells A7 to A9. Further, the external spreadsheet 22 includes an entry indicating the gains and losses for the stocks in the cell B6. The external spreadsheet 22 also includes an external output cell 210 (corresponding to cells B7 to B9) for recording the calculation results of the calculation formula set in an internal spreadsheet 24, which will be described later. The external output cell 210 is merely an example of a second cell relating to the present invention, and may be formed of a plurality of cells, as in the example in FIG. 2, or may be only of a single cell. The external spreadsheet 22 has a formula for calculating the sum of the stocks recorded in cell B11.

FIG. 3 shows the internal spreadsheet 24 as an example of a second sheet included in the database 20. The internal spreadsheet 24 employs an identifier S2, and indicates an internal processing that is performed inside the iteration processing. The internal processing means a processing performed from the start of the iteration processing to the end thereof. Specifically, the internal spreadsheet 24 includes a plurality of internal input cells 220 (corresponding to cells C3 to C5), as an example of a first cell relating to the present invention. Cell C3 is provided for recording the name of a certain stock among a plurality of stocks that are held. Cell C4 is provided for recording the quantity of pertinent stock held. Cell C5 is provided for recording the purchase price of the stocks A calculation formula for acquiring the current prices of the stocks is set in cell C6. When this calculation formula is used for calculations, the current prices of the stocks recorded in cell C3 is acquired from the outside and displayed. A calculation formula for calculating the gains and losses of the stocks is set in cell C7. This calculation formula performs calculations, by subtracting the purchase price recorded in cell C5 from the current price recorded in cell C6, and multiplying the subtraction result by the quantity of the stock recorded in cell C4. Further, the internal spreadsheet 24 may have a predetermined function recorded in cell B2. This function changeably displays an identifier indicating the arrangement order within the input data recorded in the external input cell 200 in FIG. 2, of the input data displayed in cell C3. This identifier is hereinafter called the index of input data.

Figures 4, 5:
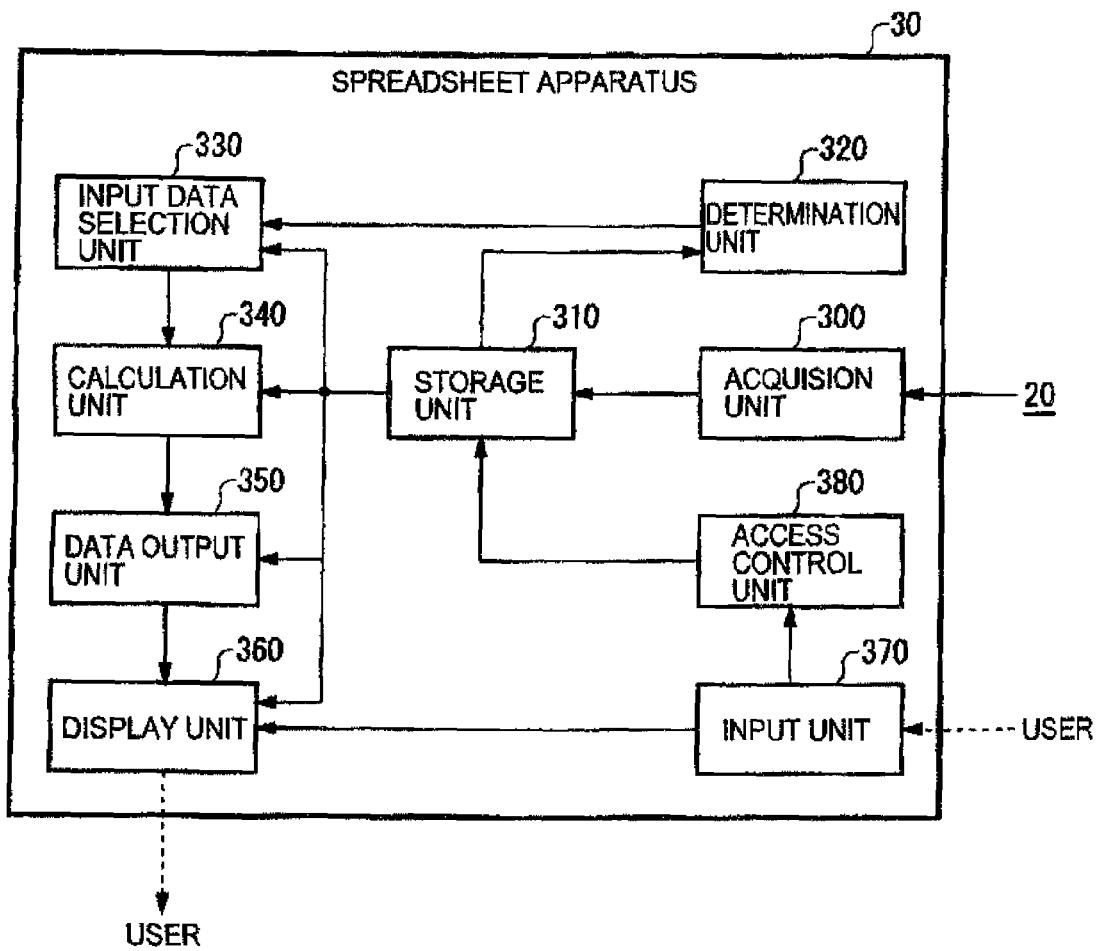
FIG. 4 is a diagram showing example of association information 26 included in the database 20.
FIG. 5 is a diagram showing the functional arrangement of a spreadsheet apparatus 30.

FIG. 4 shows an example of association information 26 included in the database 20. The database 20 has association information 26 recorded therein, in addition to the external spreadsheet 22 and the internal spreadsheet 24. The association information 26 associates cells in the external spreadsheet 22 with cells in the internal spreadsheet 24, and includes the association type. For example, the association information 26 associates the cell C2 of the external spreadsheet 22 with cell C3 of the internal spreadsheet 24, with the association type of "input", and has these items recorded therein. This means that when a plurality of input data are recorded in cell C2, which is the external input cell 200, the respective input data are sequentially selected as values in cell C3 by an input data selecting unit 200, which will be described later. Therefore, the calculation formula set in the internal spreadsheet 24 is repeatedly processed by respectively employing the respective input data recorded in the external spreadsheet 22 as input parameters.

Furthermore, the association information 26 has the cell C3 of the external spreadsheet 22 and the cell C4 of the internal spreadsheet 24 recorded therein, by associating these cells with each other. This means that when a plurality of input data are recorded in the cell C3, which is the external input cell 200, the respective input data are sequentially selected as values in cell C4 by the input data selection unit 330, which will be described later. Further, the association information 26 has the cell C4 of the external spreadsheet 22 and the cell C5 of the internal spreadsheet 24 recorded therein, by associating these cells with each other. This means that when a plurality of input data are recorded in the cell C4, which is the external input cell 200, the respective input data are sequentially selected as values in cell C5 by the input data selection unit 330. Also, the association information 26 has the cells B7 to B9 of the external spreadsheet 22 and the cell C7 of the internal spreadsheet 25 recorded therein, by associating these cells with each other, with the association type of "output". This means that when the calculation results are recorded in the cell C7, which is the internal output cell 230, the calculation results are output to the cells B7 to B9.

FIG. 5 shows the functional arrangement of the spreadsheet apparatus 30. The spreadsheet apparatus 30 includes an acquisition unit 300, a storage unit 310, a determination unit 320, an input data selection unit 330, a calculation unit 340, a data output unit 350, a display unit 360, an input unit 370 and an access control unit 380, which are typically realized by a CPU 1000, which will be described later, and controlled by a program. Further, a non-volatile memory, such as RAM, is employed for the storage unit 310.

The acquisition unit 300 acquires the external spreadsheet 22, the internal spreadsheet 24 and the association information 26 from the database 20, and stores them in the storage unit 310. The storage unit 310 supplies the storing data, such as the spreadsheets, to the respective sections. Also, the storage unit 310 changes storing spreadsheets under the control of the access control unit 380. The determination unit 320 determines whether or not the spreadsheets stored in the storage unit 310 are changed. For example, the determination unit 320 determines whether or not a plurality of input data recorded in the external input cell are changed, or whether or not the calculation formulas set in the internal output cell are changed.

The input data selection unit 330 determines whether or not any external input cell 200 of the external spreadsheet 22 having a plurality of input data recorded therein is associated with the internal input cell 220 of the internal spreadsheet 24, based on the associated information 26. The input data selection unit 330 sequentially selects of the respective input data as values for the internal input cell 220, in response to the association established. The calculation unit 340 performs a calculation of the calculation formula set in the internal output cell 230, which is a cell other than the internal input cell 220, of the internal spreadsheet 24, and referring to the internal input cell 220, in response to selection of input data as values for the internal input cell 220. The data output unit 350 outputs the calculation result of the calculation formula performed by the calculation unit 340 with respect to the respective input data, as values in the external output cell 210 of the external spreadsheet 22. That is, the display unit 360 displays the calculation result as the values in the external output cell 210 to a user, when the entire external spreadsheet 22 is to be displayed.

The input unit 370 accepts an input for changing a recorded value or a set formula in each cell from a user. Once the input unit 370 accepts an input for changing a value, the access control unit 380 determines whether or not the value change is permitted, in accordance with a pre-designated rule. For example, the access control unit will not permit the user to change the value in the internal input cell 220 and in the external output cell 210, on the condition that the external input cell 200 is associated with the internal input cell 220. Thus, the occurrence of an inconsistency between the value of input data transmitted from the external spreadsheet 22 to the internal spreadsheet 24 and the input by a user can be prevented. The access control unit 380 changes the spreadsheet stored in the storage unit 310, in accordance with the input by a user, if a value change is permitted.

The input unit 370 may also accept an input for changing an identifier that has been entered in the cell B1 of the internal spreadsheet 24. The display unit 360 changes the input data displayed in the internal input cell 220 to input data which can be identified by the identifier, in response to change in the identifier. Thus, a user can refer to the calculation result and the calculation procedure, with respect to an arbitrary one of a number of repetitively performed calculations.

FIG. 6 shows an example of the external spreadsheet 22 displayed by the display unit 360. The display unit 360 displays a plurality of stock names of stock holdings in the cell C2, which is the external input cell 200. The plurality of stock names is a plurality of input data. The display unit 360 also displays the quantities of the stock holdings in the cell C3, which is the external input cell 200. These data on the stock quantity are also a plurality of input data. Further, the display unit 360 displays the purchase prices of the stock holdings in the cell C4, which is the external input cell 200. These price data also constitute a plurality of input data.

Furthermore, the display unit 360 displays gains and losses of the respective stock holdings in the cells B7 to B9, which are external output cells 210. The data on the gain and loss are calculated by the calculation formula set in the cell C7 of the internal spreadsheet 24. Also, the display unit 360 displays the calculation result obtained using the calculation formula set in the cell B11, i.e., the sum of the gains and losses displayed in the cells B7 to B9. When four or more calculation results are obtained, not all the results can be displayed in the cells B7 to B9, and in this case, the calculation unit 340 may increase the number of second cells used to display the calculation results. That is, the calculation unit 340 may insert additional rows, as required, between the cells B8 and B9. As a result, the display unit 360 can display all the calculation results.

Figure 7:
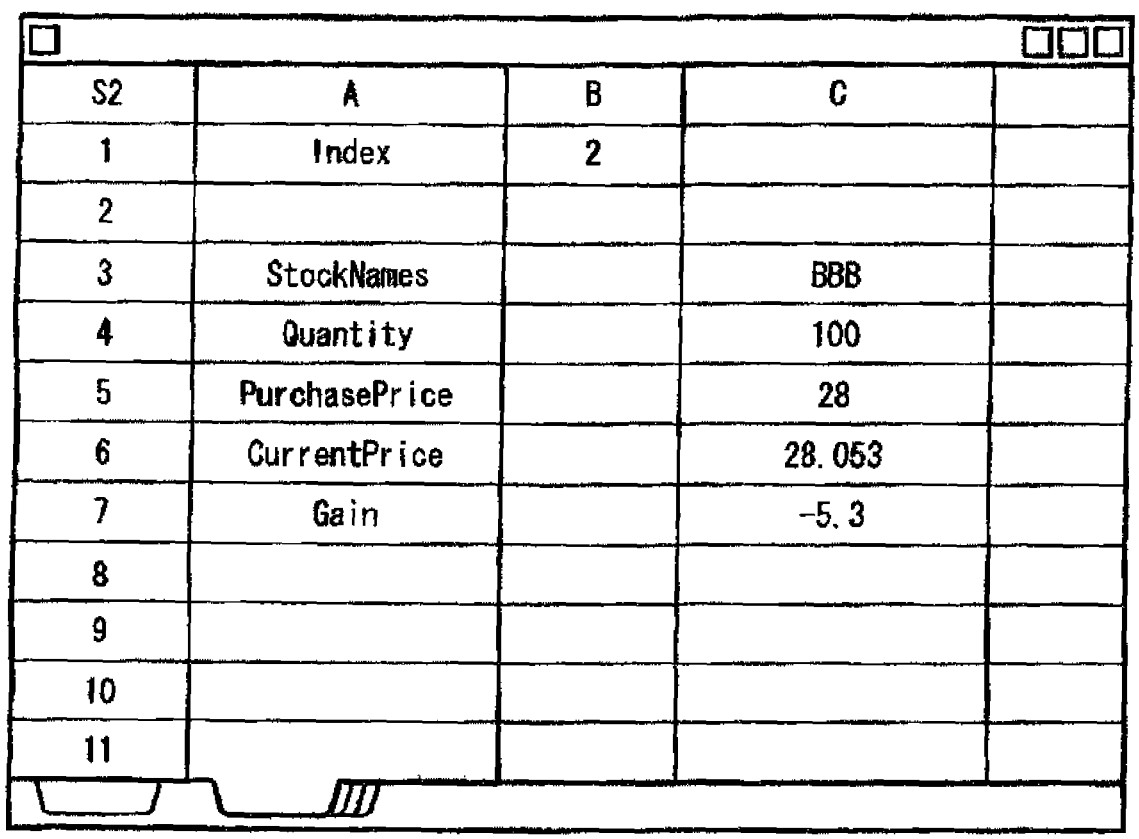
FIG. 7 is a diagram showing an example of the internal spreadsheet 24 displayed by the display unit 360.

FIG. 7 shows an example of the internal spreadsheet 24 displayed by the display unit 360. The display unit 360 displays any one of a plurality of stock names of held stocks in the cell C3, which is the internal output cell 230. The display unit 360 also displays the index of input data in the cell B1. The index displayed in the example in FIG. 7 is 2. According to this, it can be determined that input data displayed in the cell C3 of the internal spreadsheet 24 is arranged at the second position in a plurality of input data recorded in the cell C2 of the external spreadsheet 22. It can be likewise determined that input data displayed in the cell C4 of the internal spreadsheet 24 is arranged at the second position in a plurality of input data recorded in the cell C3 of the external spreadsheet 22. And it can further be determined that the input data displayed in the cell C5 of the internal spreadsheet 24 is arranged at the second position in a plurality of sets of input data recorded in the cell C4 of the external spreadsheet 22.

Furthermore, the display unit 360 displays the calculation result obtained using the calculation formula, instead of the calculation formula set in the cell C6. Since the calculation formula to obtain the current prices of stocks, selected as the values of the cell C3, is set in the cell C6, the display unit displays the current prices in the cell C6. In addition, the display unit 360 displays the calculation result obtained using the calculation formula set therein, instead of the calculation formula set in the cell C7. Since the formula for calculating the gain or loss of the stock that is selected as the value for the cell C3 is set in the cell C7, the display unit 360 displays the result of the calculation performed for the gain or loss in that cell C7.

Moreover, the display unit 360 displays the internal spreadsheet 24 in association with a symbol indicating that the calculation formula set in the internal spreadsheet 24 is applied for a plurality of input data. In the left lower corner in FIG. 7, tabs are displayed that enable the selection, using a mouse, for example, of either the external spreadsheet 22 or the internal spreadsheet 24. The display unit 360 may also employ a symbol representing overlapped tabs, for example, and separately display a tab for selecting the internal spreadsheet 24. With this display, a user can understand, at a glance, the method used for transmitting input data or the usage number for a calculation formula.

Figure 8:
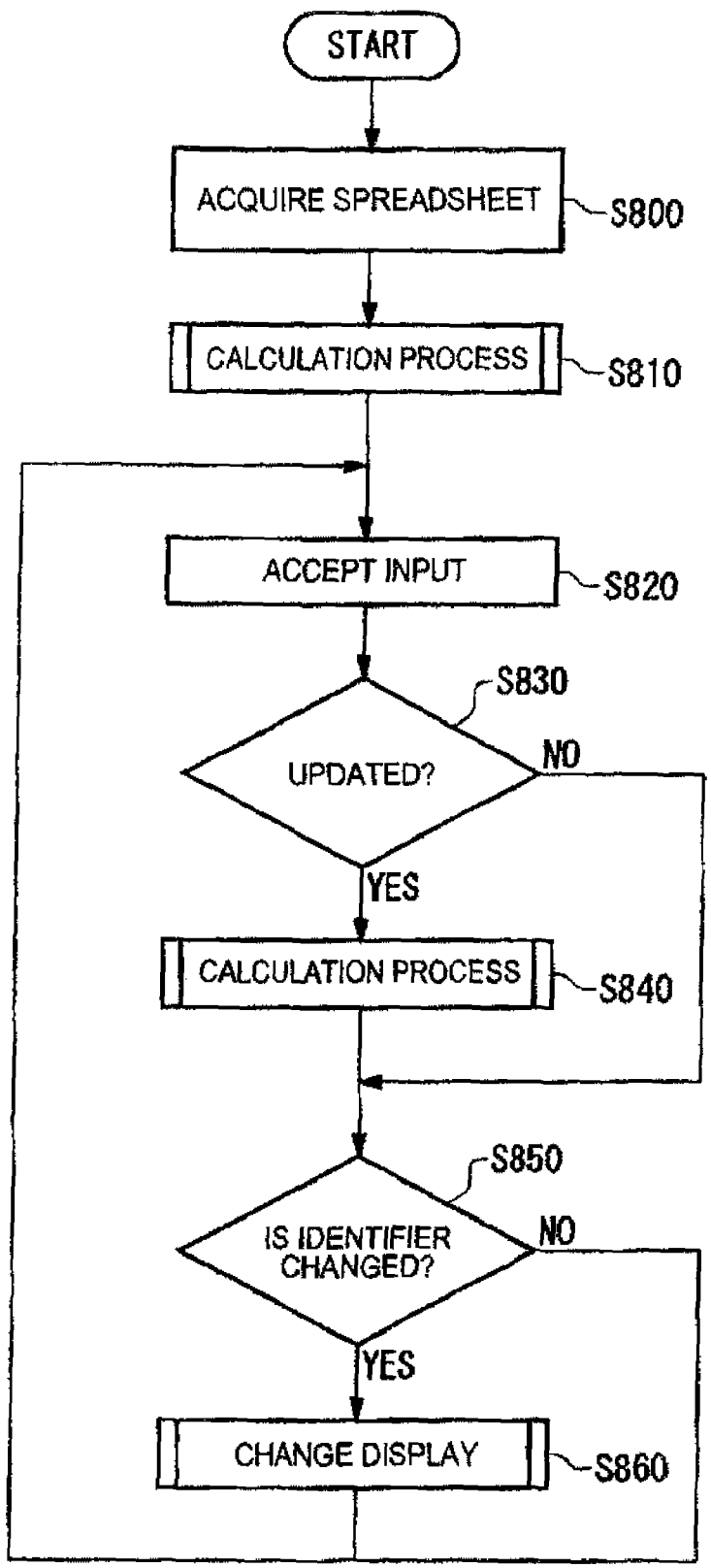
FIG. 8 is a flowchart showing the calculation processing based on data recorded in spreadsheets.

FIG. 8 shows a calculation processing that is based on data recorded in the spreadsheets. The acquisition unit 300 obtains the external spreadsheet 22, the internal spreadsheet 24 and the association information 26 from the database 20, and stores them in the storage unit 310 (S800). In consonance with the acquisition of the spreadsheets, the input data selection unit 330, the calculation unit 340 and the data output unit 350 perform calculations based on calculation formulas designated in respective cells, and the display unit 360 displays the results obtained and stored in the external spreadsheet 22 and the internal spreadsheet 24 (S810).

The input unit 370 accepts, from a user, an input for changing data recorded in the cells and calculation formulas set in the cells, or an input for changing the index for input data (S820). When the input data, or the calculation formula are changed in accordance with the input by the user (YES at S830), the calculation unit 340 employs the updated input data to perform a calculation using the calculation formula that directly or indirectly refers to the updated input data, and updates the calculation results on the display (S840). And when the calculation formula is changed, the calculation unit 340 again performs the calculation using the calculation formula, and uses the results to update the display.

The display unit 360 exchanges for the input data that was to be displayed, in the internal input cell 220, the input data identified by the updated identifier (S860), in response to acceptance of the input by the user to change the index for input data (YES at S850).

Figure 9:
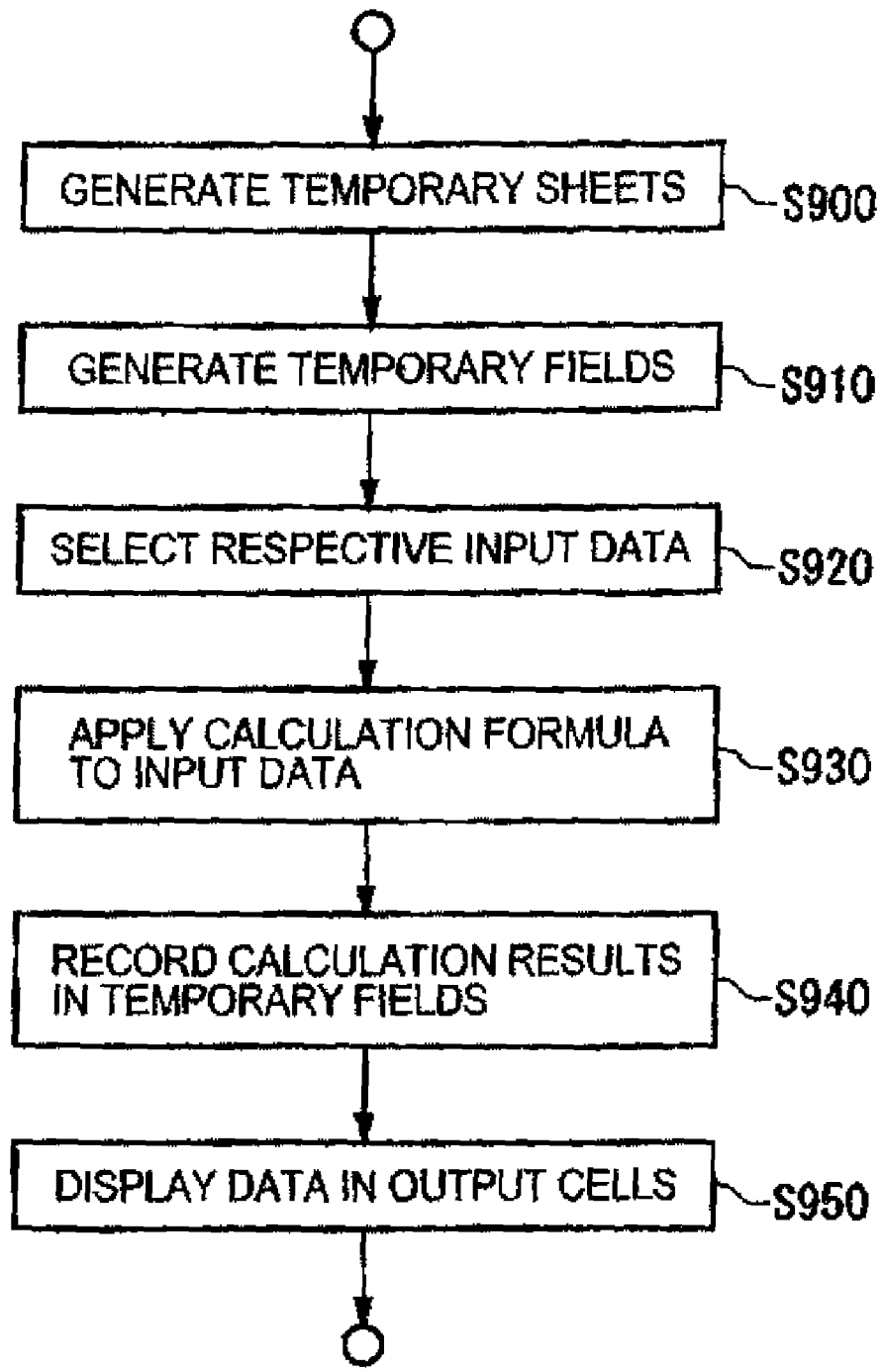
FIG. 9 is a flowchart showing the details of steps S810 and S840.

FIG. 9 shows the details of the processing of steps S810 and S840. The spreadsheet apparatus 30 performs the following processing at S810 for all the input data, and the following processing at S860 for input data which directly or indirectly refers to updated input data.

The input data selection unit 330 generates temporary sheets that have the same structure as the internal spreadsheet 24 and correspond in number to a plurality of input data (S900). When some temporary sheets have already been generated, only those required to increase the number available until correspondence is attained with the number of input data need be generated. For example, the input data selection unit 330 generates additional temporary sheets equivalent in number to the increase in the input data, under a condition that the number of input data is increased.

Sequentially, the data output unit 350 then generates temporary fields in which to record calculation results obtained using calculation formulas designated in the internal output cells 230 (S910). When some temporary fields have already been generated, only areas for which the size is too short, compared with the number of results to be recorded, need be generated. That is, the data output unit 350 generates temporary fields having a size consonant with the increase in the sets of input data, under a condition that the input data are increased.

Following this, the input data selection unit 330 selects the respective input data recorded in the external input cells 200 as values for the temporary cells that correspond to the internal input cells 220 of the temporary sheets (S920). This processing may be performed in the following manner. The spreadsheet apparatus 300 includes data having a queue structure (hereinafter referred to simply as a queue) to manage the cell to be updated and re-calculated. And at S920, the input data selection unit 330 adds the respective temporary cells to the queue.

The calculation unit 340 then performs the calculation of the calculation formulas set in the respective temporary sheets, and performs the calculations for the values in the temporary cells (S930). This processing is performed in the following manner. The calculation unit 340 extracts the cells, one by one, from the head of the queue, and re-calculates the values of the cells. When a value has been recorded in a cell, the calculation unit 340 does not perform any calculation, and instead, finds all the cells that refer to the pertinent cell and adds them to the queue. For example, when a temporary cell is extracted from the queue, the calculation unit 340 adds to the queue the other cells in which is set a calculation formula that refers to the value in this temporary cell. When the calculation formula is designated in a cell, the calculation unit 340 uses the calculation formula in this cell to perform a calculation to obtain the calculation results, and adds to the queue the other cells that refer to the calculation results. For example, when a certain cell that refers to a temporary cell is extracted from the queue, the calculation unit 340 uses the calculation formula set in the certain cell to obtain the calculation results, and adds to the queue the other cells that refer to the calculation results.

The data output unit 350 records in the temporary fields the results obtained by the calculation unit 340 while using the calculation formula for the respective input data (S940). The data output unit 350 then outputs, as data to be displayed in the external output cell 210, the calculation results recorded in the temporary fields (S950). When the other calculation formulas that refer to this data directly or indirectly are included in the external spreadsheet 22, the calculation results for these formulas are again updated. This processing can also be standardized by using a queue. For example, when the calculation results are output to the external output cell 210, the data output unit 350 adds the external output cell 210 to the queue. The calculation unit 340 then extracts the external output cell 210, and performs calculations for the other, multiple cells that refer to this external output cell 210.

According to the processing explained while referring to FIG. 9, it is possible to realize a spreadsheet process, by performing only the transmission of input data from the external spreadsheet 22 to the internal spreadsheet 24, based on the association information 26, and performing the other part of the processing by employing the unified procedures using the queue. Thus, a new function can be provided that performs a calculation processing, such as an iteration process, and that is visually comprehensible to a user who is familiar with the operation of a conventional spreadsheet system.

Figure 10:
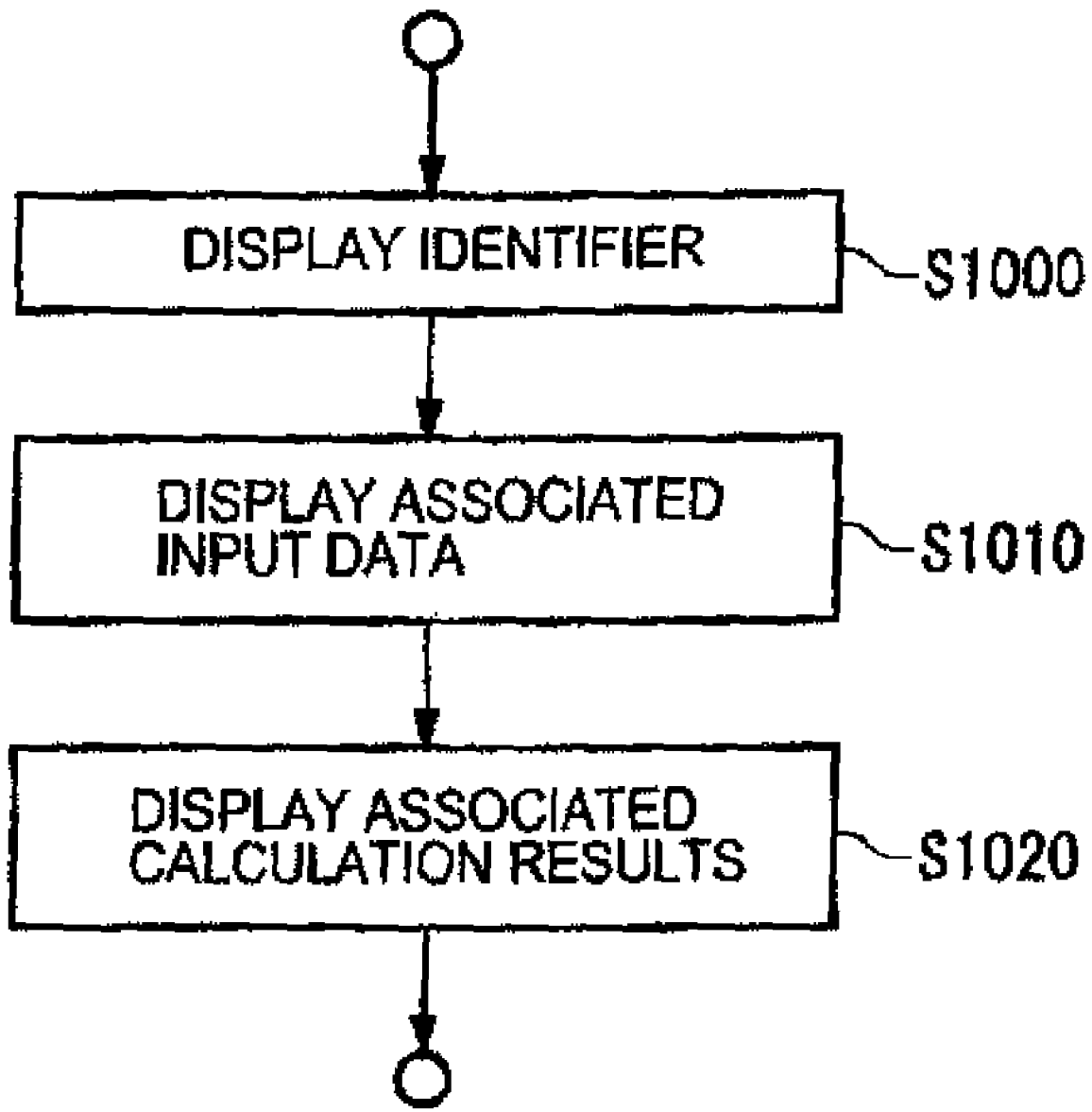
FIG. 10 is a flowchart showing the details of step S860.

FIG. 10 shows the details of the processing at S860. The display unit 360 performs the following processing to display the internal spreadsheet 24. The display unit 360 displays an identifier (the above described index) indicating the arrangement order of the input data displayed in the internal input cell 220, in the plurality of input data recorded in the external input cell 200, in association with the internal spreadsheet 24 (S1000). The index is displayed, for example, in a cell, such as the cell B1 shown in FIG. 7. However, the index may be displayed in a tag (for example, the lower left portion in FIG. 7) used to select, from among other spreadsheets, the internal spreadsheet 24.

The display unit 360 displays any one of a plurality of input data in the internal input cell 220 (S1010). For example, one of the stock names is displayed in the cell C3 exemplary shown in FIG. 7. The displayed input data are input data, among the input data recorded in the external input cells 200, arranged according to the order designated by the index. Next, the display unit 360 displays, in the internal output cell 230 in which the calculation formula is set that refers to this input data, the calculation results obtained for the input data displayed in the external input cell 200 (S1020). For example, the gains or losses for the stock displayed in the cell C3 are displayed in the cell C7 in FIG. 7.

As described while referring to FIGS. 1 to 10, the spreadsheet apparatus 30 relating to this embodiment can perform the iteration processing for a plurality of input data by employing a simple operation. Thus, a collective process for a large amount of data can be easily performed without a program having to be created. The iteration processing performed by the spreadsheet apparatus 30 of this embodiment includes another iteration processing, or may be included in the other iteration processing. An example of an iteration processing for such a telescopic structure will be explained below.

Figure 11:
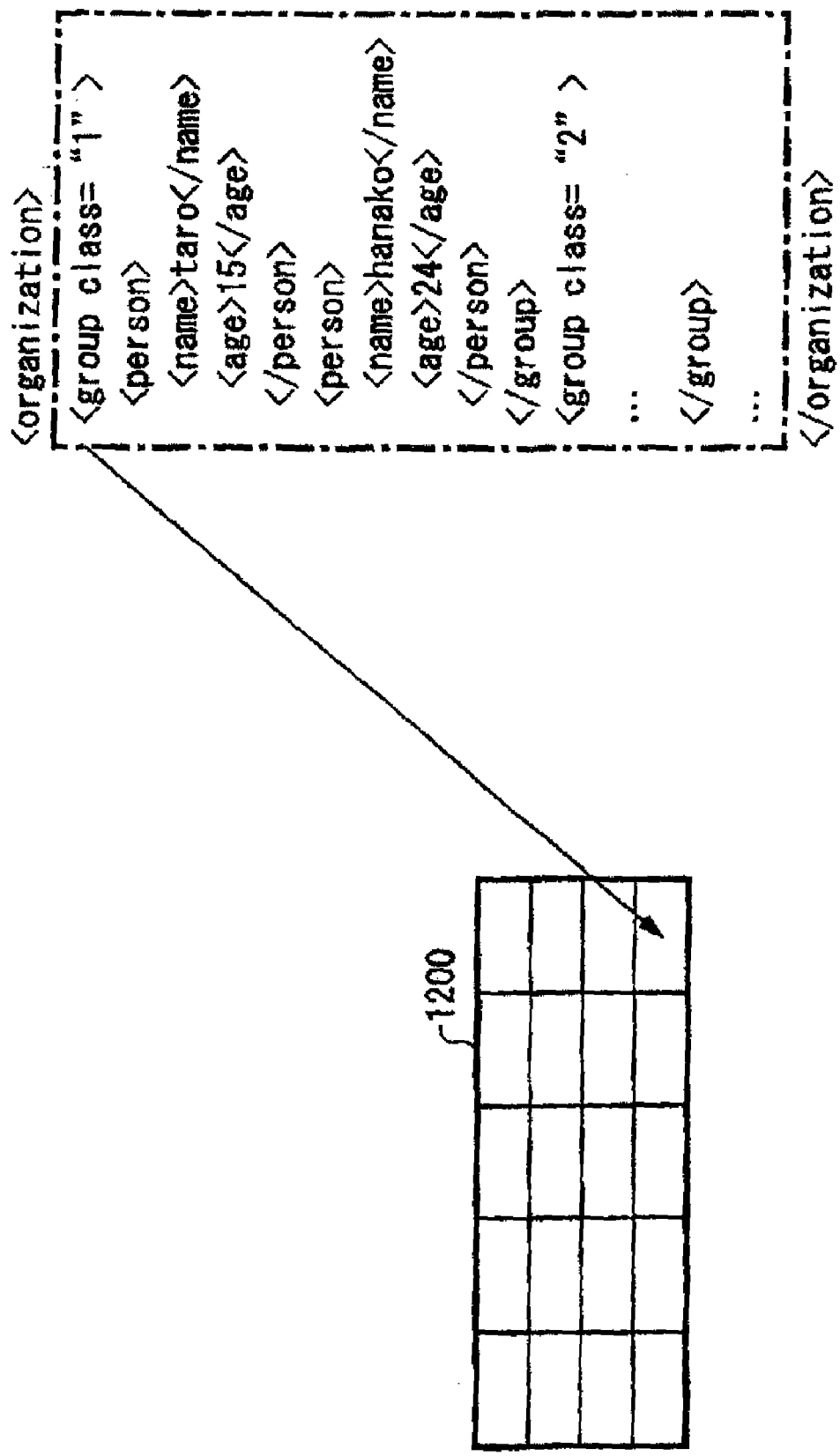
FIG. 11 is a diagram showing another example of the spreadsheet.

FIG. 11 shows another example of the spreadsheet. The left portion in FIG. 11 shows a conceptual spreadsheet 1200, and the right portion shows example data recorded in a certain cell in this spreadsheet 1200. Data recorded in this cell is written in XML (eXtensible Markup Language) and has a hierarchical structure wherein a plurality of "group" tags is included in the topmost layer. Data written from the start tag to the end tag in the "group" tags form one set of input data. That is, a plurality of sets of "group" tags constitute a plurality of sets of input data. Further, a plurality of "person" tags is written between the start tag and the end tag of one set of "group" tags.

Figure 12:
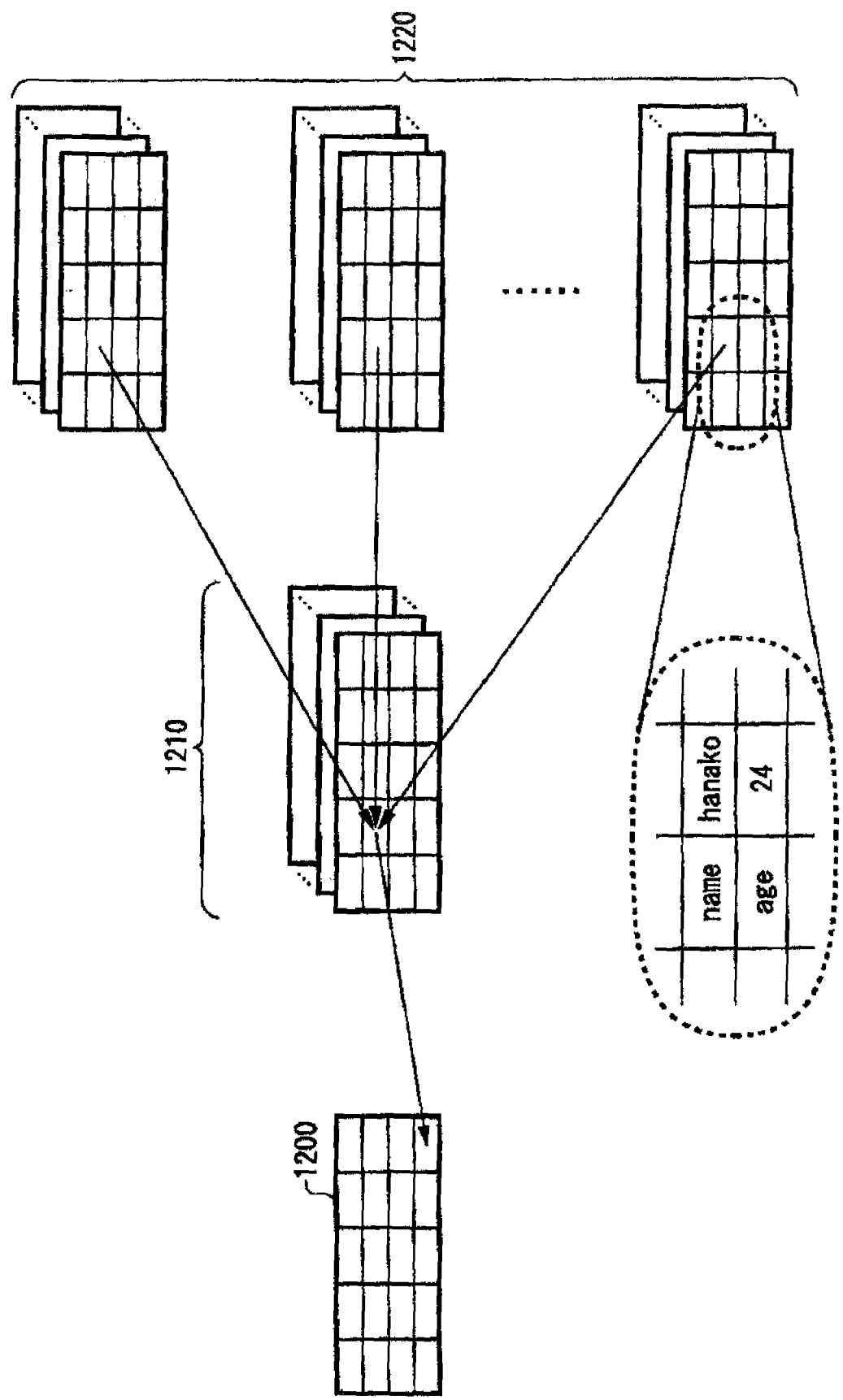
FIG. 12 is a diagram showing the concept of a processing based on the spreadsheet shown in FIG. 11.

FIG. 12 is a conceptual diagram showing the processing performed based on this example spreadsheet. The acquisition unit 300 acquires a spreadsheet 1220, which is a third sheet, in addition to a spreadsheet 1200, which is a first sheet, and a spreadsheet 1210, which is a second sheet. As in the previously described example, when cells of the spreadsheet 1200, wherein a plurality of input data (XML documents in this case) are recorded, are associated with the cells of the spreadsheet 1210, the input data selection unit 330 selects as values of the pertinent cells of the spreadsheet 1210 the respective input data. For example, data written from the start tag to the end tag of the "group" tags is selected as the value of a cell of the spreadsheet 1210.

Furthermore, the input data selection unit 330 selects the respective input data as the values of the cells of the spreadsheet 1220, in response to association of the cells of the spreadsheet 1210 having a plurality of input data (in this case, data from the start tag to the end tag of the "group" tags) recorded therein with the cells of the spreadsheet 1220. For example, data written from the start tag to the end tag of the "person" tags are selected as the values of the cells of the spreadsheet 1220. In the spreadsheet 1220, a calculation formula is described for data written using one "person" tag. The calculation unit 340 performs a calculation of the calculation formula set in a cell other than this cell in the spreadsheet 1220, and referring to this cell, in response to selection of the respective input data as the value of the cell in the spreadsheet 1220. Through this processing, for example, a value "hanako", which corresponds to the "name" tag, or a value 24, which corresponds to the "age" tag, can be referred to.

As described while referring to FIGS. 11 and 12, a plurality of occurrences of the iteration processing can be performed using the telescopic structure. In this case, only the process for data equivalent to a single layer need be written in a spreadsheet for each layer. Therefore, the process for multiple hierarchical data, such as an XML document, can be easily performed.

An explanation will now be given for an example wherein the spreadsheet apparatus 30 of this embodiment is employed for data other than spreadsheets. International Business Machines Corporation has developed a system called ADIEU (Ad Hoc Development and Integration tool for End Users). This system enables the easy preparation of a web application formed of a plurality of web pages. In ADIEU, a web page or a program, or a group of data referred to by the program is represented by a window called a card. A user need only write data in a cell in each card to define the display contents of a web page or the operating contents of a program. A user can also create a reference between one card and another, and can thus define a hyperlink between web pages and references between data.

Figure 13:
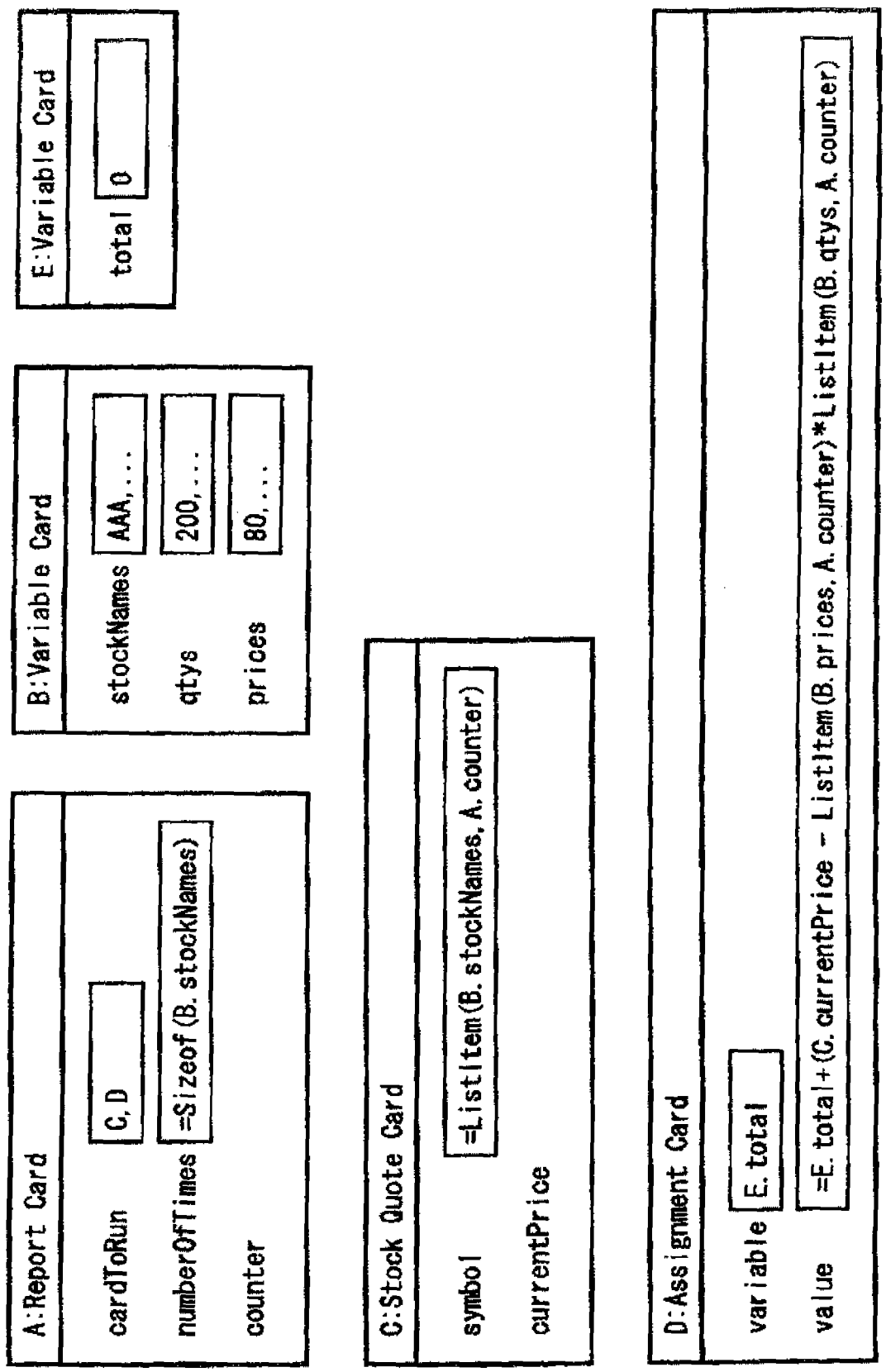
FIG. 13 is a diagram showing a conventional example for the ADIEU system.

FIG. 13 shows a conventional example for the ADIEU system. A web application program in this example calculates gains and losses for a plurality of stocks in the same manner as that used for the spreadsheets shown in FIGS. 2 to 4. This program is represented by card A, card B, card C, card D and card E. Card B and card E represent the definitions of variables. Specifically, card B indicates that an array variable stockNames is AAA, . . . , an array variable qtys is 200, . . . , and an array variable price is 80, . . . . Card E indicates that the value of a variable total is 0. The variable total is used to store calculation results, and when a calculation is not completed, the initial value 0 is stored.

Card A shows a control function for an iteration processing. In accordance with this control function, the iteration processing is performed, as indicated, for the contents of card C and card D, and is repeated until a cumulative count, equivalent to the number of elements entered for the array variable stockNames, is reached. Further defined for card A is a variable counter that is incremented by one each time the iteration process is performed. Indicated for Card C is a program that extracts an element located at a distance, equivalent to the value held by the variable counter, from the head of the array variable stockNames, and obtains the current price of a stock. Indicated for card D is a program that subtracts the purchase price of the stock from the current price obtained by the program for card C, multiplies the result by the number of stocks held, and enters the result in the variable total defined for card E.

As described above, in order to perform the iteration process using the conventional ADIEU system, the induction variable called as a counter must be introduced and the details each time the iteration processing is performed must be defined. Such a defining process may be difficult for a user who is not skilled in creating programs. Further, in this example, the user can refer to only the total gains and losses, and can not refer to the gains and losses of the individual brands obtained during the calculation process. Thus, when there is an error in data or the calculation procedures, it is difficult to identify the location where the error occurred.

Figure 14:
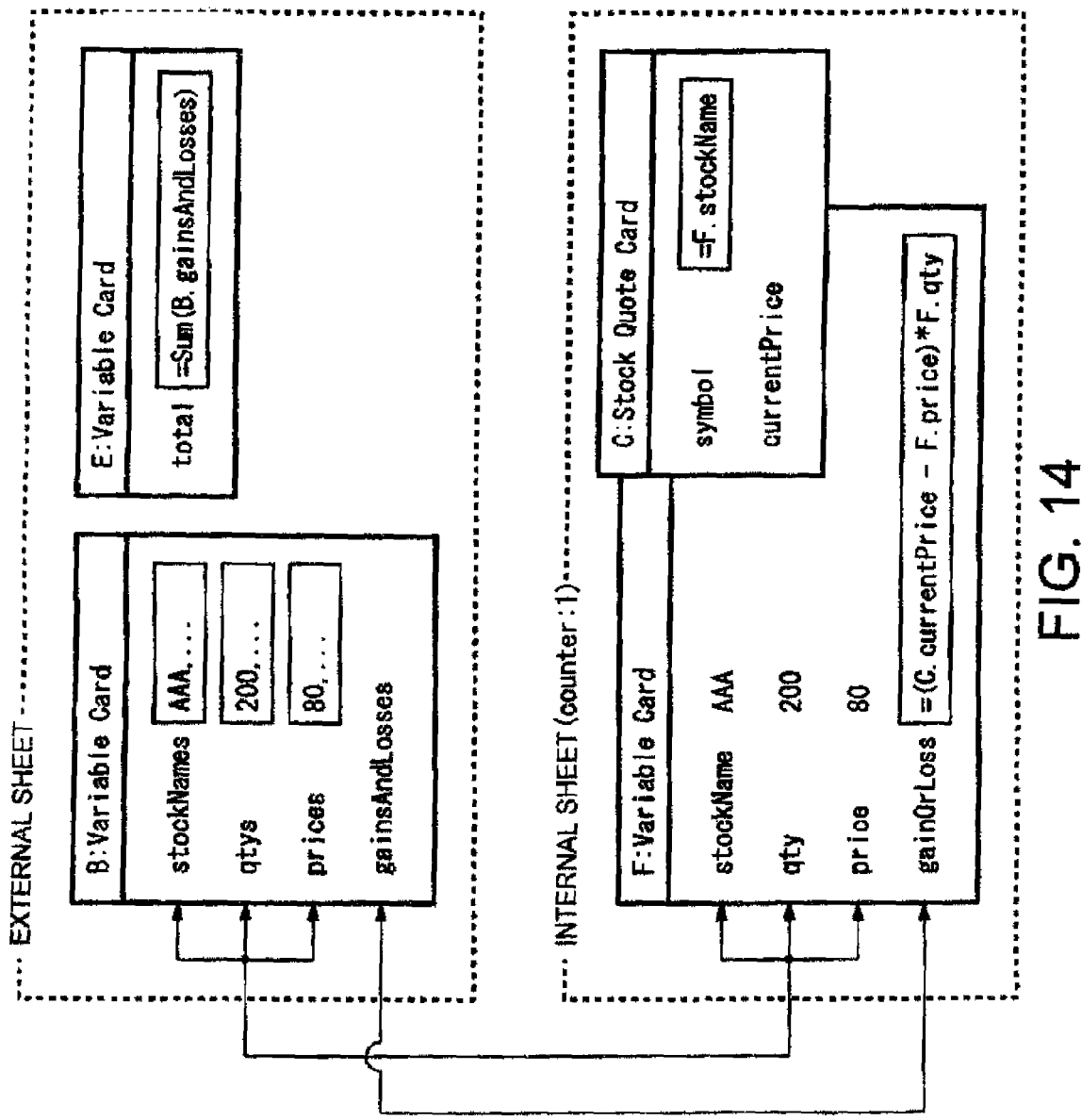
FIG. 14 is a diagram showing an example wherein a spreadsheet apparatus 30 for this embodiment is applied for the ADIEU system.

FIG. 14 shows an example wherein the spreadsheet apparatus 30 for this embodiment is applied for the ADIEU system. By using the spreadsheet apparatus 30 for the ADIEU system, a user need only input necessary values to the cells of the respective cards, so that the iteration processing can be performed without clearly defining the iteration processing. Specifically, a web application program in FIG. 14 is represented by card B, card C, card E and card F. Card B, as well as card B in FIG. 13, defines array variable stockNames, array variable qtys and array variable prices, and also defines array variable gainsAndLosses. Card E defines variable total. Card B and card E corresponds to the first spreadsheet in the examples for the spreadsheets, and the array variables stockNames, qtys and prices correspond to individual input data.

Also, card C and card F correspond to the second spreadsheet in the examples of the spreadsheets. Card F indicates variable stockName, variable qty and variable prices, and arrows in FIG. 14 indicate associations. The variable stockName is associated with the array variable stockNames, the variable qty is associated with the array variable qtys, and the variable price is associated with the array variable prices. In accordance with these associations, the input data selection unit 330 sequentially selects, as the elements of variables of the card F, the respective elements in the array variables of the card B. For example, the input data selection unit 330 selects each element of the array variable stockNames as the element of the variable stockName. In the state in FIG. 14, the first element is selected.

Card F also defines variable gainOrLoss. A calculation formula is set in a cell indicating the definition of this variable. The calculation formula represents calculation such that the purchase price of a stock selected by the input data selection unit 330 is subtracted from the current price of the stock calculated by card C, and the result is multiplied by the stock quantity of the stock selected by the input data selection unit 330. The variable gainOrLoss is correlated with the array variable gainsAndLosses of card B. In accordance with this association, the data output unit 350 outputs the value of the variable gainOrLoss as each element of the array variable gainsAndLosses.

As described above, by using the example in FIG. 14 as well as the examples of the spreadsheets, the iteration processing can be easily prepared by a simple input operation. As described above, the spreadsheet apparatus 30 of this embodiment can be applied for not only a spreadsheet system, but also another system, so long as the system defines cells and calculations used by referring to these cells.

Figure 15:
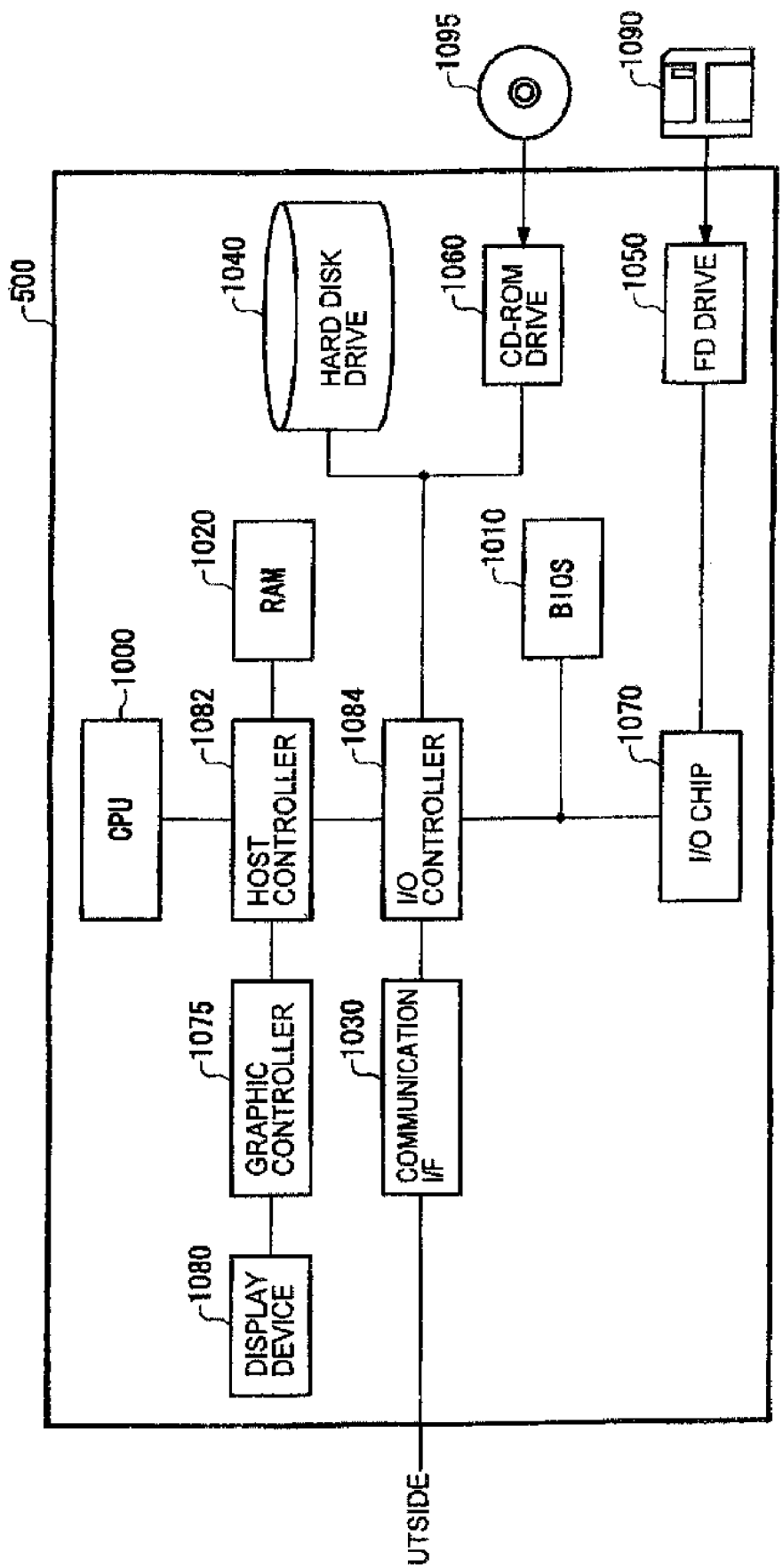
FIG. 15 is a diagram showing an example of a hardware configuration of an information processing apparatus 500 that serves as a spreadsheet system 10.

FIG. 15 shows an example of a hardware configuration for an information processing apparatus 500 that serves as a spreadsheet system 10. The information processing apparatus 500 comprises: a CPU peripheral section, which includes a CPU 1000, a RAM 1020 and a graphic controller 1075 that are interconnected by a host controller 1082; an input/output section, which includes a communication interface 1030, a hard disk drive 1040 and a CD-ROM drive 1060 that are connected to the host controller 1082 by an input/output controller 1084; and a legacy input/output section, which includes a ROM 1010, a flexible disk drive 1050 and an input/output chip 1070 that are connected to the input/output controller 1084.

The host controller 1082 connects the RAM 1020 to the CPU 1000, which accesses the RAM 1020 at a high transfer rate, and the graphic controller 1075. The CPU 1000 is operated based on programs stored in the ROM 1010 and the RAM 1020, and controls the individual components. The graphic controller 1075 obtains image data that the CPU 1000, for example, generates in a frame buffer provided for the RAM 1020, and displays the image data on a display device 1080. Instead of being provided in the RAM 1020, this frame buffer may be internally stored in the graphic controller 1075.

The input/output controller 1084 connects the host controller 1082 to the communication interface 1030, which is a comparatively fast input/output device, the hard disk drive 1040 and the CD-ROM drive 1060. The communication interface 1030 communicates with an external device through a network. The hard disk drive 1040 is used to store programs and data employed by the information processing apparatus 500. The CD-ROM drive 1060 reads a program or data from a CD-ROM 1095, and transmits it to the RAM 1020 or the hard disk drive 1040.

Further, the ROM 1010, the flexible disk drive 1050 and a comparatively slow input/output device, such as the input/output chip 1070, are connected to the input/output controller 1084. The ROM 1010 is used to store, for example, a boot program that the CPU 1000 executes at the activation of the information processing apparatus 500, and a program that depends on the hardware of the information processing apparatus 500. The flexible disk drive 1050 reads a program or data from a flexible disk 1090, and provides it through the input/output chip 1070 for the RAM 1020 or the hard disk drive 1040. The input/output chip 1070 connects the flexible disk 1090 or various types of input/output devices via, for example, a parallel port, a serial port, a keyboard port and a mouse port.

A program for the information processing apparatus 500 is provided for a user by being stored on a recording medium such as the flexible disk 1090, the CD-ROM 1095 or an IC card. The program is read from the recording medium via the input/output chip 1070 and/or the input/output controller 1084, and is installed into and executed by the information processing apparatus 500. Since the program permits the information processing apparatus 500 to perform the same operation as performed by the spreadsheet system 10 explained while referring to FIGS. 1 to 14, no further explanation for this will be given.

The above described program may be stored on an external storage medium. The storage medium is not only the flexible disk 1090 or the CD-ROM 1095, but also can be an optical recording medium, such as a DVD or a PD, a magneto-optical recording medium, such as an MD, a tape medium, or a semiconductor memory, such as an IC card. Or, a storage medium, such as a hard disk or a RAM, provided for a server system connected to a dedicated communication network or the Internet may be employed, and a program can be provided via the network for the information processing apparatus 500.

Embodiments of the present invention have been described by employing various examples; however, the technical scope of embodiments of the present invention is not limited to the embodiments or examples described, and it should be appreciated that any embodiment can be variously modified or altered. For example, the input data selection unit 330 may repetitively select the input data as the values of external input cells corresponding to a plurality of temporary sheets, under the condition that a single input datum is recorded in a pre-designated external input cell. In this case, calculation for this single input datum is repetitively performed for multiple temporary sheets. This arrangement is effective for a case wherein a constant defined in an external spreadsheet can be referred to by an internal spreadsheet. Further, when a plurality of sets of input data are recorded in a plurality of cells in an external spreadsheet, and these cells are associated with a cell in an internal spreadsheet, there is a case wherein the number of data elements in a cell of the external spreadsheet differs from each other. In this case, a specific setup may also be selected, e.g., the iteration calculation is performed in consonance with the maximum number of elements, and a specific setup value is employed for a cell, for which data is insufficient, or the iteration processing is performed in consonance with the minimum number of elements, and extra data elements are disregarded. As another example, the value of a cell of a specific internal spreadsheet can be referred to only by using a calculation formula designated in the specific internal spreadsheet, or by using a calculation formula designated in another internal spreadsheet that employs the specific internal spreadsheet as an external spreadsheet. With this arrangement, ambiguity about a reference destination, which is caused by generation of a plurality of temporary sheets, can be eliminated, and development and maintenance of the spreadsheet system and the operation for a user can be simplified.

What is claimed is:

1. A method for performing a calculation processing for each cell in a sheet by setting a calculation formula to calculate values for the cell using a computer, comprising;
a storing step where the computer stores a first sheet, a second sheet and a correspondence information allowing a cell in the first sheet and a cell in the second sheet to correspond to each other in a memory unit of the computer, the first sheet and second sheets including data with a queue structure for managing the updating and re-calculating of cells in the first sheet and the second sheet;
an associating step of using associating information to associate cells in the first sheet and the second sheet with the associating information including an association type;
a further associating step of associating the values of each of the cells in both the first sheet and the second sheet, the value of each of the cells in the second sheet being an array of values, and the value of each of the cells in the first sheet being one of the elements of the array of values corresponding to the value of one of the cells in the second sheet;

an input data step where the computer sequentially selects a respective plurality of input data as values for cells within the first sheet, in response to deciding that the cells where a plurality of input data are recorded within the first sheet correspond to the array of values of the cells within the second sheet, according to the correspondence information;

a further input data step of generating temporary sheets corresponding to the input data, and generating additional temporary sheets equivalent to an increase in the input data;

a calculation step where the computer performs, in response to respective input data selected as values for the cells within the first sheet in the input data selection step, a calculation with a calculation formula set in a cell in the first sheet other than the cells containing the input data and referring to the cells within the first sheet corresponding to one of the elements of the array of values of the cells in the second sheet;

a further calculation step of extracting cells in the temporary sheets and recalculating values of the cells in the temporary sheets, the temporary sheets forming an iterative calculation without control variables;

a modification step for modifying intermediate states of iterations of the recalculating of the values of the cells in the first sheet, the second sheet, and the temporary sheets by interactively viewing and changing values of one of the cells in the first sheet, second sheet, and temporary sheets;

a further calculation step of the computer finding all cells that refer to one of the cells in the temporary sheets and adding the cells that refer to one of the cells in the temporary sheets to a queue for calculating the contents of one of the cells in the temporary sheets when a value is stored in one of the cells in the temporary sheets; and a data output step where the computer outputs calculated results calculated with the calculation formula obtained in the calculation step for the respective input data, as one or more values of second cells within the second sheet corresponding to the cell in the first sheet where the calculation formula is set, according to the correspondence information.

\* \* \* \* \*